(12) United States Patent
Kweon

(10) Patent No.: US 10,175,787 B2
(45) Date of Patent: Jan. 8, 2019

(54) TRANSPARENT ELECTRODE FILMS AND TOUCH PANEL COMPRISING THE SAME

(71) Applicant: HYUNDAI MOTOR COMPANY, Seoul (KR)

(72) Inventor: Kyoung Chun Kweon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 89 days.

(21) Appl. No.: 15/382,305

(22) Filed: Dec. 16, 2016

(65) Prior Publication Data

US 2018/0113525 A1    Apr. 26, 2018

(30) Foreign Application Priority Data

Oct. 24, 2016 (KR) .................. 10-2016-0138362

(51) Int. Cl.
*H01B 1/04* (2006.01)
*G06F 3/041* (2006.01)

(52) U.S. Cl.
CPC .... *G06F 3/041* (2013.01); *G06F 2203/04103* (2013.01)

(58) Field of Classification Search
CPC ......... H01L 31/1884; H01L 31/022466; H01L 51/102; H01L 33/42; H01L 51/5215; H01L 51/5234; H01L 27/323; H01L 51/5203; G09G 2300/0426; G09G 2300/0421; G06F 2203/04103; G06F 2203/04112; G06F 3/047; G06F 1/16; G06F 1/1637; G06F 3/044; G06F 3/0412; G06F 3/041; G06F 3/045
USPC .................................. 345/173–175
See application file for complete search history.

(56) References Cited

U.S. PATENT DOCUMENTS

| | | | |
|---|---|---|---|
| 2008/0143906 A1* | 6/2008 | Allemand | B82Y 10/00 349/43 |
| 2013/0258568 A1* | 10/2013 | Iwata | H01B 1/22 361/679.01 |

FOREIGN PATENT DOCUMENTS

| | | |
|---|---|---|
| JP | 5827749 B | 12/2015 |
| KR | 102010-0017128 A | 2/2010 |
| KR | 102013-0074167 A | 7/2013 |
| KR | 102014-0028890 A | 3/2014 |
| KR | 10-2013-0081007 A | 5/2014 |
| KR | 102014-0137939 A | 12/2014 |
| KR | 10-2016-0071542 A | 6/2016 |

* cited by examiner

*Primary Examiner* — Duc Q Dinh
(74) *Attorney, Agent, or Firm* — McDonnell Boehnen Hulbert & Berghoff LLP

(57) ABSTRACT

A transparent electrode according to an example embodiment includes a transparent base layer; a metal nanowire layer disposed on the transparent base layer; and a metal oxide layer disposed on the metal nanowire layer. A hard coating layer is disposed on an upper surface or a lower surface of the transparent base layer.

15 Claims, 3 Drawing Sheets

300

| | |
|---|---|
| Anti-glare layer | 150 |
| Optical adhesive layer | 140 |
| Cover layer | 130 |
| Optical adhesive layer | 140 |
| Upper electrode layer | 120 |
| Optical adhesive layer | 140 |
| Lower electrode layer | 110 |
| Optical bonding layer | 160 |
| Light source | 170 |

| Cover layer | —130 |
| Optical adhesive layer | —140 |
| Upper electrode layer | —120 |
| Optical adhesive layer | —140 |
| Lower electrode layer | —110 |

| Anti-glare layer | —150 |
| Optical adhesive layer | —140 |
| Cover layer | —130 |
| Optical adhesive layer | —140 |
| Upper electrode layer | —120 |
| Optical adhesive layer | —140 |
| Lower electrode layer | —110 |

TRANSPARENT ELECTRODE FILMS AND TOUCH PANEL COMPRISING THE SAME

CROSS-REFERENCE TO RELATED APPLICATION

This application claims priority to and the benefit of Korean Patent Application No. 10-2016-0138362 filed in the Korean Intellectual Property Office on Oct. 24, 2016, the entire contents of which are incorporated herein by reference.

BACKGROUND (a) Technical Field

Transparent electrode films and touch panels including the same are disclosed. More specifically, transparent electrode films having a low reflectance without the application of a separate anti-reflective coating and touch panels including the same are disclosed.

(b) Description of the Related Art

A vehicle is a means for transporting objects such as a human, an item, an animal, or the like from a starting point to a destination, and is designed to travel in a predetermined direction by turning at least one wheel during the run on a road or a rail. The vehicle may, for example, include a three-wheeled or four-wheeled car; a two-wheeled vehicle such as a motorcycle, a bicycle and the like; a construction machine, and a train running on a rail among others.

A touch display capable of providing various information to a driver or a passenger may be installed in or on the vehicle. The touch display may be used for various purposes. For example, the touch display may reproduce music, a picture, or a motion picture or accept and display a ground-wave broadcast, a satellite broadcast, or the like to provide various entertainments inside the vehicle. In addition, the touch display may show information such as a vehicle state, weather, news, or the like as a predetermined image for a user's convenience. Furthermore, the touch display may provide a navigation function. The touch display may be installed on a dashboard of the vehicle, but is optimally positioned near a driver seat for operational convenience.

When the touch display has high reflection, it may cause glare affecting a driver's eyes during the run, thereby interrupting the driver's view and causing safety concerns. Thus, it is desirable to have a touch screen with an anti-glare, anti-reflective function.

Conventionally, an anti-reflecting (AR) multi-layered thin film is formed on the surface of the touch panel after manufacturing. For example, more than one layer formed of oxide such as silicon oxide ($SiO_2$), aluminum oxide ($Al_2O_3$), titanium oxide ($TiO_2$), or the like is formed on both surfaces of the touch panel. However, this conventional method increases the thickness of the touch panel and complicates the manufacturing process.

SUMMARY

An example embodiment according to the present disclosure provides a transparent electrode film capable of minimizing light reflection without addition of a separate anti-reflective film and a touch panel including the same. In addition, a display for a vehicle using the anti-reflective touch panel is provided.

A transparent electrode according to an example embodiment includes a transparent base layer; a metal nanowire layer disposed on the transparent base layer; and a metal oxide layer disposed on the metal nanowire layer. A hard coating layer may be disposed on an upper surface or a lower surface of the transparent base layer.

An upper hard coating layer may be disposed on the upper surface of the transparent base layer and a lower hard coating layer may be disposed on a lower surface of the transparent base layer.

The transparent base layer may be composed of one or more materials selected from glass, polyethylene, polycarbonate, polyethylene phthalate, polypropylene, polyimide, polyetherimide, polyphenyleneether, polyethylene terephthalate, polybutylene terephthalate, polyetherketone, polystyrene, polyacrylate, polymethylmethacrylate, polyacrylonitrile, polyvinyl chloride, and polyvinyl alcohol.

The metal nanowire layer may include a silver nanowire or a copper nanowire. The metal nanowire layer may include a metal nanowire having a diameter of about 10 nm to about 50 nm and a length of about 5 μm to about 10 μm. The thickness of the metal nanowire layer may range from about 50 nm to about 100 nm. The metal nanowire layer may include about 2 g to about 5 g of the metal nanowire per 1 $m^2$.

The metal oxide layer may include one or more of an indium-tin oxide, a fluorine-containing tin oxide, an indium-zinc oxide, an aluminum-doped zinc oxide, and an aluminum-tin oxide. The thickness of the metal oxide layer may range from about 0.01 μm to about 0.1 μm.

The hard coating layer may include one or more of acryl-based, urethane-based, epoxy-based and siloxane-based polymer materials. The thickness of the hard coating layer may range from about 0.5 μm to about 5 μm.

In an example embodiment, the transparent electrode may have a reflectance of less than or equal to about 8.0% when light at a 550 nm wavelength is radiated at an angle of about 20 degrees.

A touch panel includes a lower electrode layer including the transparent electrode; an upper electrode layer disposed on the lower electrode layer and including the transparent electrode; and a cover layer disposed on the upper electrode layer.

The lower electrode layer may be adhered to the upper electrode layer using an optical adhesive layer; similarly, the upper electrode layer may be adhered to the cover layer an optical adhesive layer.

The anti-reflective touch panel may further include an anti-glare layer disposed on the cover layer, and the cover layer and the anti-glare layer may be adhered to each other through an optical adhesive layer.

The assembled touch panel may have a reflectance of less than or equal to about 1.5% when light at a 550 nm wavelength is radiated at an angle of about 20 degrees.

An anti-reflective touch display for a vehicle includes a light source; an optical bonding layer disposed on the light source; a lower electrode layer including the transparent electrode disposed on the optical bonding layer; an upper electrode layer including the transparent electrode disposed on the lower electrode layer, and a cover layer disposed on the upper electrode layer.

According to an example embodiment, a transparent electrode and an anti-reflective touch panel using the transparent electrode provide an anti-reflective function without addition of a separate anti-reflecting layer, thereby allowing for reduced thickness of the anti-reflective touch panel and a less complicated and less expensive manufacturing process.

BRIEF DESCRIPTION OF THE DRAWINGS

FIG. 3 is a schematic view illustrating the layers of an example embodiment of an anti-reflective touch panel using a transparent electrode.

FIG. 4 is a schematic view illustrating the layers of another example embodiment of an anti-reflective touch panel using a transparent electrode.

DETAILED DESCRIPTION

Figure 1:
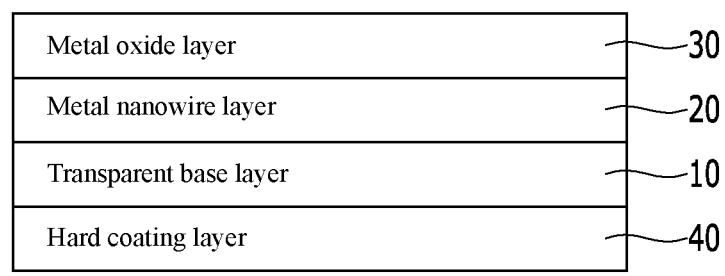
FIG. 1 is a schematic view illustrating a the layers of an example embodiment of a transparent electrode.

The advantages and features of the present disclosure and the methods for accomplishing the same will be apparent from the example embodiments described hereinafter with reference to the accompanying drawings. However, the present invention is not limited to the example embodiments described hereinafter, but may be embodied in many different forms. The following example embodiments are provided to make the disclosure of the present invention complete and to allow those skilled in the art to clearly understand the scope of the present invention, and the present invention is defined only by the scope of the appended claims. Throughout the specification, the same reference numerals denote the same elements.

It will be understood that when an element is referred to as being "on" another element, it can be directly on the other element or intervening elements may also be present. In contrast, when an element is referred to as being "directly on" another element, there are no intervening elements present.

In some example embodiments, detailed description of well-known technologies will be omitted to prevent the disclosure of the present invention from being interpreted ambiguously. Unless otherwise defined, all terms (including technical and scientific terms) used herein have the same meaning as commonly understood by one of ordinary skill in the art. In addition, throughout the specification, unless explicitly described to the contrary, the word "comprise" and variations such as "comprises" or "comprising" will be understood to imply the inclusion of stated elements but not the exclusion of any other elements. Further, as used herein, the singular forms are intended to include the plural forms as well, unless the context clearly indicates otherwise.

FIG. 1 is a schematic view illustrating the layers of an example embodiment of a transparent electrode 100.

As shown in FIG. 1, a transparent electrode 100 includes a transparent base layer 10; a metal nanowire layer 20 disposed on transparent base layer 10; and a metal oxide layer 30 disposed on metal nanowire layer 20. A hard coating layer 40 may be formed on an upper surface or a lower surface of transparent base layer 10. In FIG. 1, hard coating layer 40 is formed on the lower surface of transparent base layer 10.

As described above, in an example embodiment, transparent electrode 100 includes transparent base layer 10, metal nanowire layer 20, metal oxide layer 30, and hard coating layer 40. Because each layer of transparent electrode 100 respectively has a high and low refractive index repeatedly, transparent electrode 100 exhibits a reduction in reflection. In addition, the structure of the example embodiment of transparent electrode 100 provides characteristics such as durability, high temperature/high humidity resistance, static electricity resistance, yellowness resistance, and [high?] transmittance, among others.

FIG. 1 shows only the basic structure of the transparent electrode 100 according to an example embodiment, but transparent electrode 100 may further include additional layers, depending on the application. Each component of transparent electrode 100 is described in detail below.

Transparent base layer 10 provides physical, structural support for transparent electrode 100.

Transparent base layer 10 may be composed of glass or a polymer resin. The polymer resin may include one or more of polyethylene, polycarbonate, polyethylene phthalate, polypropylene, polyimide, polyetherimide, polyphenylene ether, polyethylene terephthalate, polybutylene terephthalate, polyetherketone, polystyrene, polyacrylate, polymethylmethacrylate, polyacrylonitrile, polyvinyl chloride, and polyvinyl alcohol.

The thickness of transparent base layer 10 may range from about 10 m to about 150 μm.

Metal nanowire layer 20 is disposed on transparent base layer 10. In embodiments where hard coating layer 40 is formed on the upper surface of transparent base layer 10, metal nanowire layer 20 may be formed on hard coating layer 40. Metal nanowire layer 20 may act to supplement electric conductivity of metal oxide layer 30 (described below) and cause light-scattering and thus increases the reflection-reducing effect.

Metal nanowire layer 20 may include a silver nanowire or a copper nanowire. In a preferred embodiment, the silver nanowire is used.

Metal nanowire layer 20 may include a metal nanowire having a diameter of about 10 nm to about 50 nm and a length of about 5 μm to about 10 μm. When the metal nanowire has too large a diameter or is too long, the coating quality of metal oxide layer 30 on metal nanowire layer 20 may be deteriorated. In contrast, a metal nanowire having a smaller diameter or a shorter length, however, provides no significant advantage in terms of conductivity and the like. Therefore, a metal nanowire having a diameter and a length within the above ranges may be used.

The thickness of metal nanowire layer 20 may range from about 50 nm to about 100 nm. When metal nanowire layer 20 is too thick, the transparent electrode 100 may exhibit yellowing. When metal nanowire layer 20 is too thin, it may not provide sufficient conductivity. Accordingly, example embodiments of metal nanowire layer 20 have thickness in the above ranges.

Metal nanowire layer 20 may include about 2 g to about 5 g of the metal nanowire per 1 $m^2$. When an insufficient amount of the metal nanowire is used, metal nanowire layer 20 conductivity may not have sufficient conductivity. When an excess of metal nanowire is used, transparent electrode 100 may be discolored, or sheet resistance may be increased. Therefore, example embodiments of transparent electrode 100 include an amount of metal nanowire in the ranges above.

Metal oxide layer 30 is disposed on metal nanowire layer 20. Metal oxide layer 30 may prevent oxidization of metal nanowire layer 20 and provide high temperature/high humidity characteristics.

Metal oxide layer 30 may include one or more of an indium-tin oxide ("ITO"), a fluorine-containing tin oxide ("FTO"), an indium-zinc oxide ("IZO"), an aluminum-doped zinc oxide ("AZO"; aluminum-zinc oxide; ZnO:Al), and an aluminum-doped tin oxide ("ATO"; aluminum-tin oxide; $SnO_2$:Al). In a preferred embodiment, the FTO is used. When the FTO is used for metal oxide layer 30, fluorine may be doped in an amount of about 0.1 to about 1.5 wt %. Within this range, sheet resistance and transparency characteristics of transparent electrode 100 may be improved. In a further preferred embodiment, the fluorine may be doped in an amount of about 0.5 to about 1.3 wt %.

The thickness of metal oxide layer 30 may range from about 0.01 μm to about 0.1 μm. When metal oxide layer 30 is too thin, metal nanowire layer 20 may be oxidized and fail to sufficiently provide high temperature/high humidity resistance characteristics. When metal oxide layer 30 is too thick, transmittance of transparent electrode 100 may be deteriorated.

Hard coating layer 40 is disposed on an upper surface or a lower surface of transparent base layer 10. In general, hard coating layer 40 may act to bond its adjacent layers. In an example embodiment, hard coating layer 40 also acts to significantly decreases reflectance of transparent electrode 100 due to a difference in refractive index.

Hard coating layer 40 may include one or more of acryl-based, urethane-based, epoxy-based and siloxane-based polymer materials. In a preferred embodiment, the acryl-based polymer material is used.

The thickness of hard coating layer 40 may range from about 0.5 μm to about 5 μm. When hard coating layer 40 is too thin, the characteristics described above effect may not be exhibited. In contrast, when hard coating layer 40 is too thick, production costs increase more rapidly than increases in desired characteristics.

Figure 2:
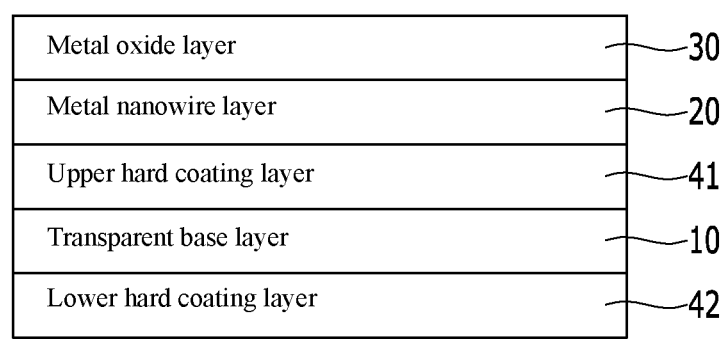
FIG. 2 is a schematic view illustrating the layers of a transparent electrode according to another example embodiment.

As shown in FIG. 2, hard coating layer 40 may be formed on both upper and lower surfaces of transparent base layer 10. Hard coating layer formed on the upper surface of transparent base layer 10 is designated an upper hard coating layer 41, and the hard coating layer formed on the lower surface of transparent base layer 10 is designated a lower hard coating layer 42.

Upper and lower hard coating layers 41 and 42 may be formed of the aforementioned materials for hard coating layer 40 and have the thickness described for hard coating layer 40.

Transparent electrode 100 according to an example embodiment may function as a low reflectance film. Specifically, when light at a 550 nm wavelength is radiated at an angle of about 20 degrees, transparent electrode 100 may have a reflectance of less than or equal to about 8.0%.

FIG. 3 is a schematic view illustrating the layers of another example embodiment of a touch panel 200.

As shown in FIG. 3, a touch panel 200 according to an example embodiment includes a lower electrode layer 110 including the above transparent electrode 100; an upper electrode layer 120 formed on lower electrode layer 110 and including the above transparent electrode 100; and a cover layer 130 formed on upper electrode layer 120. Inclusion of both lower electrode layer 110 and upper electrode layer 120 having the low-reflectance transparent electrode 100, allows touch panel 200 to exhibit the low-reflectance characteristics of the lower and upper electrode layers.

Lower electrode layer 110 may be adhered to upper electrode layer 120 using an optical adhesive layer 140; similarly, upper electrode layer 120 may be adhered to cover layer 130 using an optical adhesive layer 140.

Optical adhesive layer 140 may be formed by coating a solid optically-clear adhesive ("OCA") or a liquid optical resin (optically-clear resin, "OCR").

Cover layer 130 may be two-dimensionally flat or three-dimensionally curved. Cover layer 130 may be composed of a high-transmittance insulating material such as glass, polycarbonate ("PC"), polyethylene terephthalate ("PET"), polymethyl methacrylate ("PMMA"), or a cyclic olefin copolymer ("COC"), but is not limited thereto.

As shown in the example embodiment of FIG. 4, touch panel 200 may further include an anti-glare layer 150 formed on cover layer 130. Cover layer 130 and anti-glare layer 150 may be adhered to each other using optical adhesive layer 140. Anti-glare layer 150 acts to further reduce surface reflectance.

Anti-reflective touch panel 200 according to an example embodiment has low reflectance without the addition of a separate anti-reflective coating. Specifically, reflectance may be less than or equal to about 1.5% when light at a 550 nm wavelength is radiated at an angle of about 20 degrees.

The anti-reflective touch panel 200 according to an example embodiment may be used to various fields. For example, when a light source such as an LCD, LED, or the like is disposed beneath anti-reflective touch panel 200, it may be used as an AVN (Audio, Video, Navigation) system.

Figure 5:
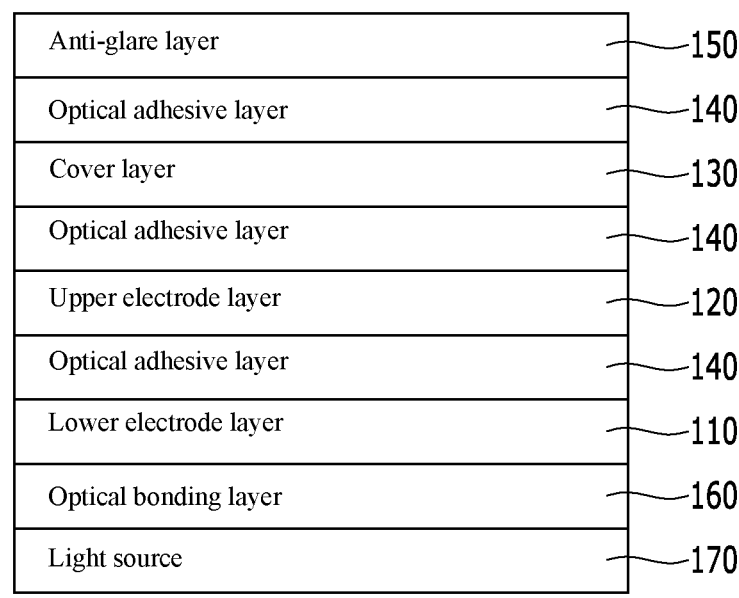
FIG. 5 is a schematic view illustrating the layers of an example embodiment of an anti-reflective touch display for a vehicle using a transparent electrode.

As shown in FIG. 5, an example embodiment of an anti-reflective touch display 300 for a vehicle includes light source 170; optical bonding layer 160 disposed on light source 170; lower electrode layer 110 including transparent electrode 100 formed on optical bonding layer; upper electrode layer 120 including transparent electrode 100 formed on lower electrode layer 110; and cover layer 130 formed on upper electrode layer 120.

Hereinafter, examples of the present invention and comparative examples are described. These examples, however, should not in any sense be interpreted as limiting the scope of the present invention.

EXPERIMENTAL EXAMPLE 1

Manufacture of Transparent Electrode

Example 1

A transparent electrode was manufactured by laminating a lower hard coating layer, a transparent base layer, an upper hard coating layer, a metal nanowire layer, and a metal oxide layer in order.

Specific materials and thicknesses of each layer and diameter, thickness, and content of the metal nanowire are shown in Table 1.

Example 2

A transparent electrode was manufactured according to the same method as Example 1 without inclusion of a lower hard coating layer. In Example 2, the transparent base layer, the upper hard coating layer, the metal nanowire layer, and the metal oxide layer were laminated together.

Specific materials and thicknesses of each layer and diameter, thickness, and content of the metal nanowire are shown in Table 1.

Examples 3 to 8

Transparent electrodes 3-8 were each manufactured according to the same method as Example 1. Specific materials and thicknesses of each layer and diameter, thickness, and content of the metal nanowire are shown in Table 1.

Comparative Examples 1 and 3

A transparent electrode was manufactured by laminating a transparent base layer and a metal oxide layer in order. Specific materials and thicknesses of each layer are shown in Table 1.

Comparative Example 4

A transparent electrode was manufactured by laminating a transparent base layer and a metal nanowire layer in order.

Specific materials and thicknesses of each layer and diameter, thickness, and content of the metal nanowire are shown in Table 1.

obtain resistance, and the resistance was used to obtain a sheet resistance unit of ohm/sq by applying a correction factor ("CF") thereto.

TABLE 1

| | Composition | | | | | | |
|---|---|---|---|---|---|---|---|
| | Metal oxide layer (nm) | Metal nanowire layer | | | Upper hard coating layer (μm) | Transparent base layer (μm) | Lower hard coating layer (μm) |
| | | AgNW Diameter (nm) | Thickness of layer (nm) | Amount of AgNW (g/m²) | | | |
| Example 1 | FTO 20 | 33 | 88 | 4.69 | Acryl-based resin 1.0 | PET 125 | Acryl-based resin 1.4 |
| Example 2 | FTO 20 | 33 | 88 | 4.69 | — | PET 125 | acryl-based resin 1.3 |
| Example 3 | FTO 20 | 26 | 53 | 3.62 | acryl-based resin 1.0 | PET 50 | acryl-based resin 1.3 |
| Example 4 | FTO 20 | 18 | 53 | 2.60 | acryl-based resin 1.0 | PET 50 | acryl-based resin 1.3 |
| Example 5 | FTO 20 | 18 | 79 | 2.60 | acryl-based resin 1.0 | PET 50 | acryl-based resin 1.2 |
| Example 6 | FTO 20 | 18 | 119 | 2.60 | acryl-based resin 1.0 | PET 50 | acryl-based resin 1.3 |
| Example 7 | FTO 20 | 18 | 53 | 1.82 | acryl-based resin 1.0 | PET 50 | acryl-based resin 1.3 |
| Example 8 | FTO 20 | 33 | 88 | 3.85 | acryl-based resin 1.0 | PET 125 | acryl-based resin 1.4 |
| Comparative Example 1 | ITO 125 | — | — | — | — | glass 125 | — |
| Comparative Example 2 | ITO 125 | — | — | — | — | PET 125 | — |
| Comparative Example 3 | FTO 20 | — | — | — | — | PET 125 | — |
| Comparative Example 4 | — | 33 | 88 | 4.69 | — | PET 125 | — |

FTO: fluorine-containing tin oxide
ITO: indium-tin oxide
PET: polyethylene terephthalate
AgNW: average length 7 μm Various properties of the manufactured transparent electrodes were evaluated according to the method below, and the results are shown in Table 2.

Heat Resistance: Transmittance, yellowness, and touch operability were examined after they were allowed to stand in a chamber at a fixed temperature of 95 degrees C. for 168 hours. When the transmittance, yellowness, and touch operability remain the same throughout the test, the results are deemed satisfactory; otherwise, if transmittance, yellowness, and touch operability degrade, the results are deemed unsatisfactory.

Surface Reflectance: Measured at a wavelength of 550 nm at 20 degrees by using a surface reflectance meter.

Sheet Resistance: Four point probes arranged in one direction with a spacing of 1 mm was used. The four point probes were used to measure a current and a voltage to High Temperature/High Humidity Effects: Transmittance, yellowness, and touch operability were examined after allowing them to stand for 168 hours in a chamber under a fixed temperature environment of 85 degrees C. and 85% humidity. When the transmittance, yellowness, and touch operability remain the same throughout the test, the results are deemed satisfactory; otherwise, if transmittance, yellowness, and touch operability degrade, the results are deemed unsatisfactory.

Transmittance: Transmittance was measured by using a transmittance meter. The transmittance was examined in a visible light region (in a wavelength region of 380 to 770 nm).

Yellowness: b* was measured by using a color difference meter. A yellowness degree relative to an initial color was examined.

TABLE 2

| | Heat resistance | Surface reflectance (%) | Surface resistance (Ω) | High temperature High humidity | Transmittance (%) | Yellowness (Δb < 1) |
|---|---|---|---|---|---|---|
| Example 1 | Satisfactory | 8.6 | 60 | Satisfactory | 91 ± 2 | Satisfactory |
| Example 2 | Satisfactory | 9.0 | 60 | Satisfactory | 91 ± 2 | Satisfactory |
| Example 3 | Satisfactory | 7.4 | 60 | Satisfactory | 91 ± 2 | Satisfactory |
| Example 4 | Satisfactory | 7.0 | 60 | Satisfactory | 91 ± 2 | Satisfactory |
| Example 5 | Satisfactory | 7.8 | 60 | Satisfactory | 91 ± 2 | Satisfactory |
| Example 6 | Satisfactory | 7.9 | 60 | Satisfactory | 91 ± 2 | Satisfactory |
| Example 7 | Satisfactory | 10.5 | 80 | Satisfactory | 91 ± 2 | Satisfactory |
| Example 8 | Satisfactory | 11.1 | 80 | Satisfactory | 91 ± 2 | Satisfactory |
| Comparative Example 1 | Satisfactory | 20.2 | 150 | Satisfactory | 93 ± 2 | Satisfactory |
| Comparative Example 2 | Satisfactory | 15 | 150 | Satisfactory | 90 ± 2 | Satisfactory |
| Comparative Example 3 | Satisfactory | 14.1 | 100 | Satisfactory | 90 ± 2 | Satisfactory |
| Comparative Example 4 | Satisfactory | 14.0 | 60 | Unsatisfactory | 91 ± 2 | Satisfactory |

As shown in Table 2, Examples 1 to 6 exhibited excellent surface reflectance of less than or equal to 11.1% and simultaneously, excellent characteristics such as heat resistance, sheet resistance, high temperature/high humidity resistance, transmittance, yellowness, and the like. On the other hand, Comparative Examples 1 to 4 showed high surface reflectance. In addition, Comparative Examples 1 to 3 unsatisfactory sheet resistance.

EXPERIMENTAL EXAMPLE 2

Manufacture of Touch Panel

Example 9

The transparent electrode according to Example 6 was twice stacked, and a cover layer was formed on the upper transparent electrode.

Example 10

The transparent electrode according to Example 6 was twice stacked, a cover layer was formed on the upper transparent electrode, and an anti-glare layer was formed on the cover layer.

Comparative Example 5

The transparent electrode according to Comparative Example 3 was twice stacked.

Comparative Example 6

The transparent electrode according to Comparative Example 3 was twice stacked, a cover layer was formed on the upper transparent electrode, and an anti-glare layer was formed on the cover layer.

Comparative Example 7

The transparent electrode according to Comparative Example 3 was twice stacked, a cover layer was formed on the upper transparent electrode, and an anti-glare layer was formed on the cover layer. Then, on the lower surface thereof, an anti-reflection layer (AR layer) consisting of $Al_2O_3$, $TiO_2$, $SiO_2$, $TiO_2$, $SiO_2$, $TiO_2$, and $SiO_2$ layers was formed. The AR layer was about 350 nm thick in total.

Comparative Example 8

The transparent electrode according to Comparative Example 3 was twice stacked, a cover layer was formed on the upper transparent electrode, and an anti-glare layer was formed on the cover layer. On the upper and lower surfaces, an anti-reflection layer (AR layer) consisting of $Al_2O_3$, $TiO_2$, $SiO_2$, $TiO_2$, $SiO_2$, $TiO_2$, and $SiO_2$ layers was respectively formed. The AR layers were about 350 nm thick in total.

TABLE 3

| | AR lower surface coating | Lower electrode | Upper electrode | AG film | Cover glass | AR upper surface coating |
|---|---|---|---|---|---|---|
| Example 9 | — | Example 6 | Example 6 | — | ○ | — |
| Example 10 | — | Example 6 | Example 6 | ○ | ○ | — |
| Comparative Example 5 | — | Comparative Example 3 | Comparative Example 3 | — | ○ | — |
| Comparative Example 6 | — | Comparative Example 3 | Comparative Example 3 | ○ | ○ | — |

TABLE 3-continued

|  | AR lower surface coating | Lower electrode | Upper electrode | AG film | Cover glass | AR upper surface coating |
|---|---|---|---|---|---|---|
| Comparative Example 7 | ○ | Comparative Example 3 | Comparative Example 3 | ○ | ○ | — |
| Comparative Example 8 | ○ | Comparative Example 3 | Comparative Example 3 | ○ | ○ | ○ |

The properties of the manufactured touch panels were evaluated using the test methods described above, as well as the additional following test methods, and the results are shown in Table 4.

Antistatic Electricity: Touch operation performance of the touch panels was examined by applying an impact with 8 kV ten times after respectively designating nine measurement regions in the touch panels.

Touch Uniformity: A touch driving board was manufactured and tested to assess whether a predetermined pattern (a circle and the like) could be drawn without a disconnection.

TABLE 4

|  | Heat resistance | Surface reflectance (%) | Anti-static electricity | High temperature High humidity | Touch uniformity | Transmittance (%) | Yellowness (Δb) @ 95° C., 168 hr |
|---|---|---|---|---|---|---|---|
| Example 9 | Satisfactory | 1.3 | Satisfactory | Satisfactory | Satisfactory | 89.8 | 0.82 |
| Example 10 | Satisfactory | 0.9 | Satisfactory | Satisfactory | Satisfactory | 89.5 | 0.81 |
| Comparative Example 5 | Satisfactory | 10.1 | Satisfactory | Satisfactory | Satisfactory | 89.3 | 0.84 |
| Comparative Example 6 | Satisfactory | 4.2 | Satisfactory | Satisfactory | Satisfactory | 85.4 | 0.82 |
| Comparative Example 7 | Satisfactory | 1.8 | Satisfactory | Satisfactory | Satisfactory | 89.1 | 0.83 |
| Comparative Example 8 | Satisfactory | 1.3 | Satisfactory | Satisfactory | Satisfactory | 89.1 | 0.82 |

As shown in Table 4, Examples 9 and 10 showed excellent surface reflectance of less than or equal to 1.3% and simultaneously, excellent characteristics such as heat resistance, antistatic electricity resistance, high temperature/high humidity resistance, touch uniformity, transmittance, yellowness, and the like. On the other hand, only Comparative Example 8 having an AR layer on the upper and lower surfaces showed equivalent surface reflectance to that of Example, whereas Comparative Examples 5 to 7 showed high surface reflectance.

EXPERIMENTAL EXAMPLE 3

Manufacture of Touch Display

Example 11

An LCD was affixed to the lower surface of the touch panel according to Example 10 through optical bonding.

Comparative Examples 9 to 12

An LCD was affixed to the lower surfaces of the touch panels according to Comparative Examples 7 to 10 through optical bonding.

The touch displays were evaluated using the test methods previously described, and the results are shown in Table 5.

TABLE 5

|  | Touch panel | Heat resistance | Surface reflectance (%) | Anti-static electricity | High temperature High humidity | Touch uniformity |
|---|---|---|---|---|---|---|
| Example 11 | Example 10 | Satisfactory | 0.6 | Satisfactory | Satisfactory | Satisfactory |
| Comparative Example 9 | Comparative Example 5 | Satisfactory | 10.1 | Satisfactory | Satisfactory | Satisfactory |
| Comparative Example 10 | Comparative Example 6 | Satisfactory | 4.4 | Satisfactory | Satisfactory | Satisfactory |
| Comparative Example 11 | Comparative Example 7 | Satisfactory | 2.4 | Satisfactory | Satisfactory | Satisfactory |

TABLE 5-continued

| | Touch panel | Heat resistance | Surface reflectance (%) | Anti-static electricity | High temperature High humidity | Touch uniformity |
|---|---|---|---|---|---|---|
| Comparative Example 12 | Comparative Example 8 | Satisfactory | 1.3 | Satisfactory | Satisfactory | Satisfactory |

As shown in Table 5, Example 11 showed excellent surface reflectance of less than or equal to 0.6% and simultaneously, and excellent characteristics such as heat resistance, antistatic electricity resistance, high temperature/high humidity resistance, touch uniformity, and the like. On the other hand, Comparative Examples 9 to 12 showed high surface reflectance.

While this invention has been described in connection with practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be example but not limiting the present invention in any way.

| <Description of Symbols> | |
|---|---|
| 100: transparent electrode, | 10: transparent base layer, |
| 20: metal nanowire layer, | 30: metal oxide, |
| 40: hard coating layer, | 200: touch panel, |
| 110: lower electrode, | 120: upper electrode, |
| 130: cover layer, | 140: optical adhesive layer, |
| 150: anti-glare layer, | 300: touch screen, |
| 160: optical bonding layer, | 170: light source |

What is claimed is:

1. A transparent electrode, comprising
a transparent base layer;
a metal nanowire layer disposed on the transparent base layer;
a metal oxide layer disposed on the metal nanowire layer; and
a hard coating layer disposed on an upper surface or a lower surface of the transparent base layer,
wherein the metal nanowire layer includes a metal nanowire having a diameter of from about 18 nm to about 26 nm, the metal nanowire layer comprises from about 2 g to about 5 g of the metal nanowire per 1 m$^2$, and the transparent electrode has a reflectance of less than or equal to about 8.0% when light at a 550 nm wavelength is radiated at an angle of about 20 degrees.

2. The transparent electrode of claim 1, wherein an upper hard coating layer is disposed on the upper surface of the transparent base layer and a lower hard coating layer is disposed on a lower surface of the transparent base layer.

3. The transparent electrode of claim 1, wherein the transparent base layer is composed of a material selected from glass, polyethylene, polycarbonate, polyethylene phthalate, polypropylene, polyimide, polyetherimide, polyphenyleneether, polyethylene terephthalate, polybutylene terephthalate, polyetherketone, polystyrene, polyacrylate, polymethylmethacrylate, polyacrylonitrile, polyvinyl chloride, and polyvinyl alcohol.

4. The transparent electrode of claim 1, wherein the metal nanowire layer includes a silver nanowire or a copper nanowire.

5. The transparent electrode of claim 1, wherein the metal nanowire has a length of from about 5 μm to about 10 μm.

6. The transparent electrode of claim 1, wherein the metal nanowire layer has a thickness of from about 50 nm to about 100 nm.

7. The transparent electrode of claim 1, wherein the metal oxide layer is composed of a material selected from an indium-tin oxide, a fluorine-containing tin oxide, an indium-zinc oxide, an aluminum-doped zinc oxide, and an aluminum-doped tin oxide.

8. The transparent electrode of claim 1, wherein the metal oxide has a thickness of from about 0.01 μm to about 0.1 μm.

9. The transparent electrode of claim 1, wherein the hard coating layer is composed of a material selected from an acryl-based, a urethane-based, an epoxy-based and a siloxane-based polymer material.

10. The transparent electrode of claim 1, wherein the hard coating layer has a thickness of from about 0.5 μm to about 5 μm.

11. A touch panel comprising:
a lower electrode layer including the transparent electrode of claim 1;
an upper electrode layer disposed on the lower electrode layer and including the transparent electrode of claim 1; and
a cover layer disposed on the upper electrode.

12. The touch panel of claim 11, wherein the lower electrode is adhered to the upper electrode using an optical adhesive layer; and the upper electrode is adhered to the cover layer using an optical adhesive layer.

13. The touch panel of claim 11, wherein the touch panel further comprises an anti-glare layer disposed on the cover layer, and
wherein the cover layer and the anti-glare layer are adhered to each other using an optical adhesive layer.

14. The touch panel of claim 11, wherein the touch panel has a reflectance of less than or equal to about 1.5% when light at a 550 nm wavelength is radiated at an angle of about 20 degrees.

15. A touch display for a vehicle, comprising
a light source;
an optical bonding layer disposed on the light source;
a lower electrode layer disposed on the optical bonding layer and including the transparent electrode of claim 1;
an upper electrode layer disposed on the lower electrode layer and including the transparent electrode of claim 1, and
a cover layer disposed on the upper electrode.

* * * * *